Jan. 31, 1956 E. McIVER ERVIN 2,732,961
TOBACCO HARVESTING MACHINES
Filed June 14, 1954 5 Sheets-Sheet 1
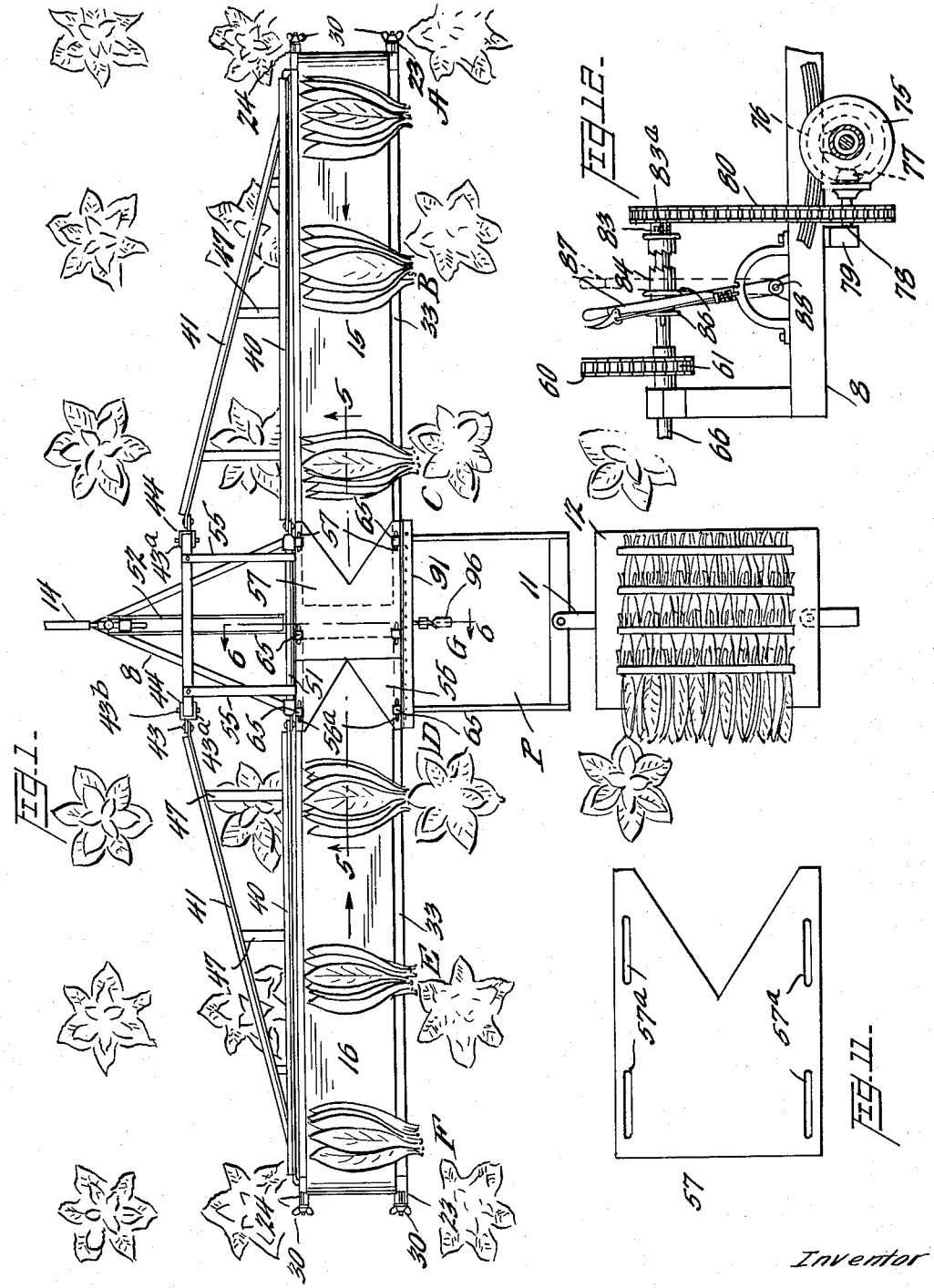
Inventor
E. M. Ervin
By
Watson, Cole, Grindle & Watson
Attorneys Jan. 31, 1956
E. McIVER ERVIN
2,732,961
TOBACCO HARVESTING MACHINES
Filed June 14, 1954
5 Sheets-Sheet 2
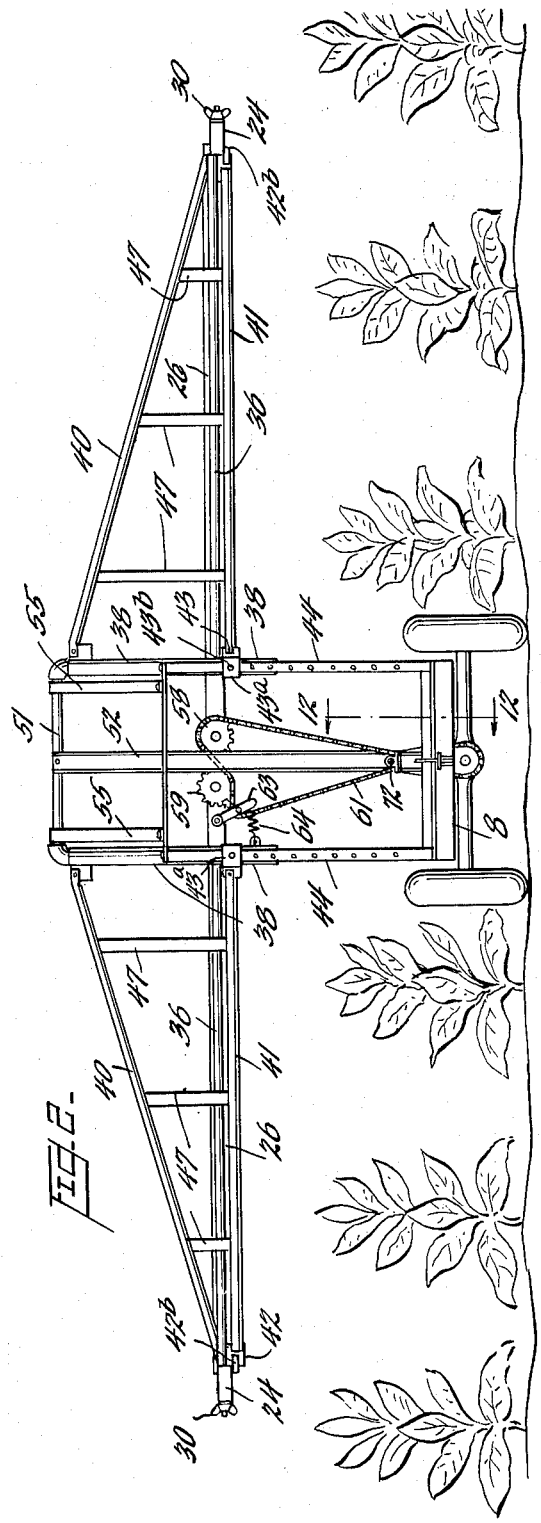
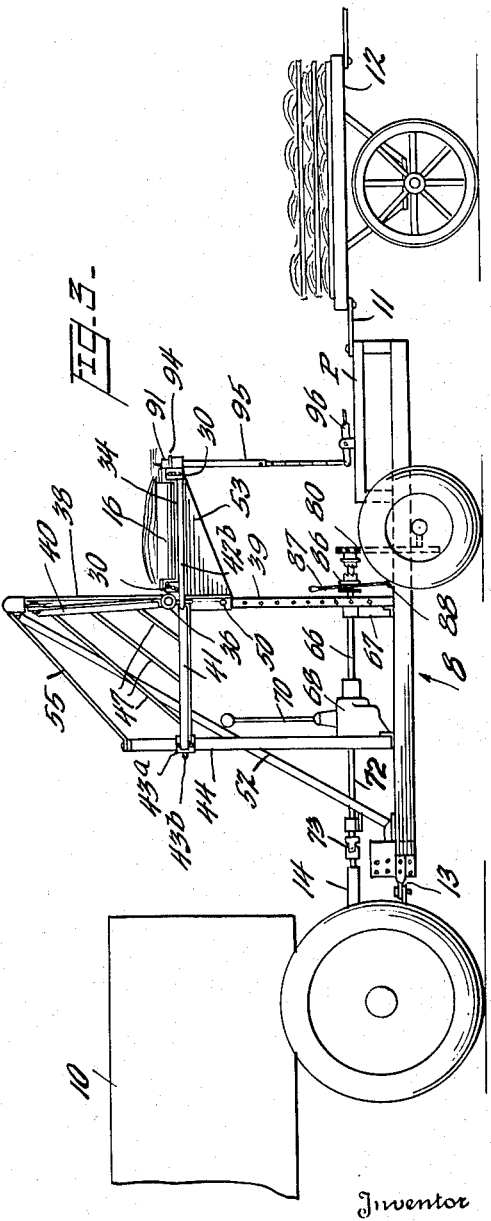
Inventor
E. M. Ervin
By Watson, Cole, Grindle & Watson
Attorney

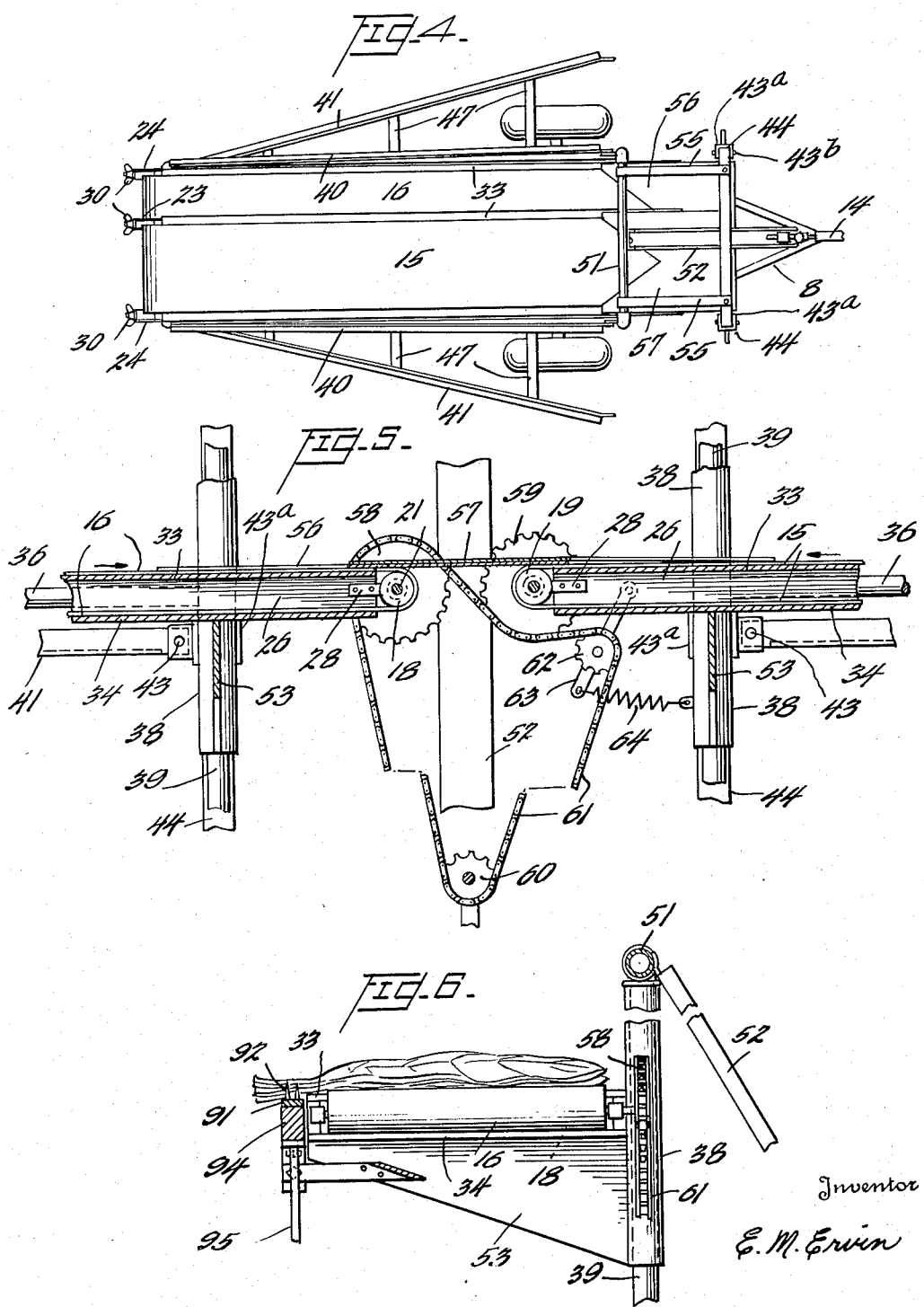

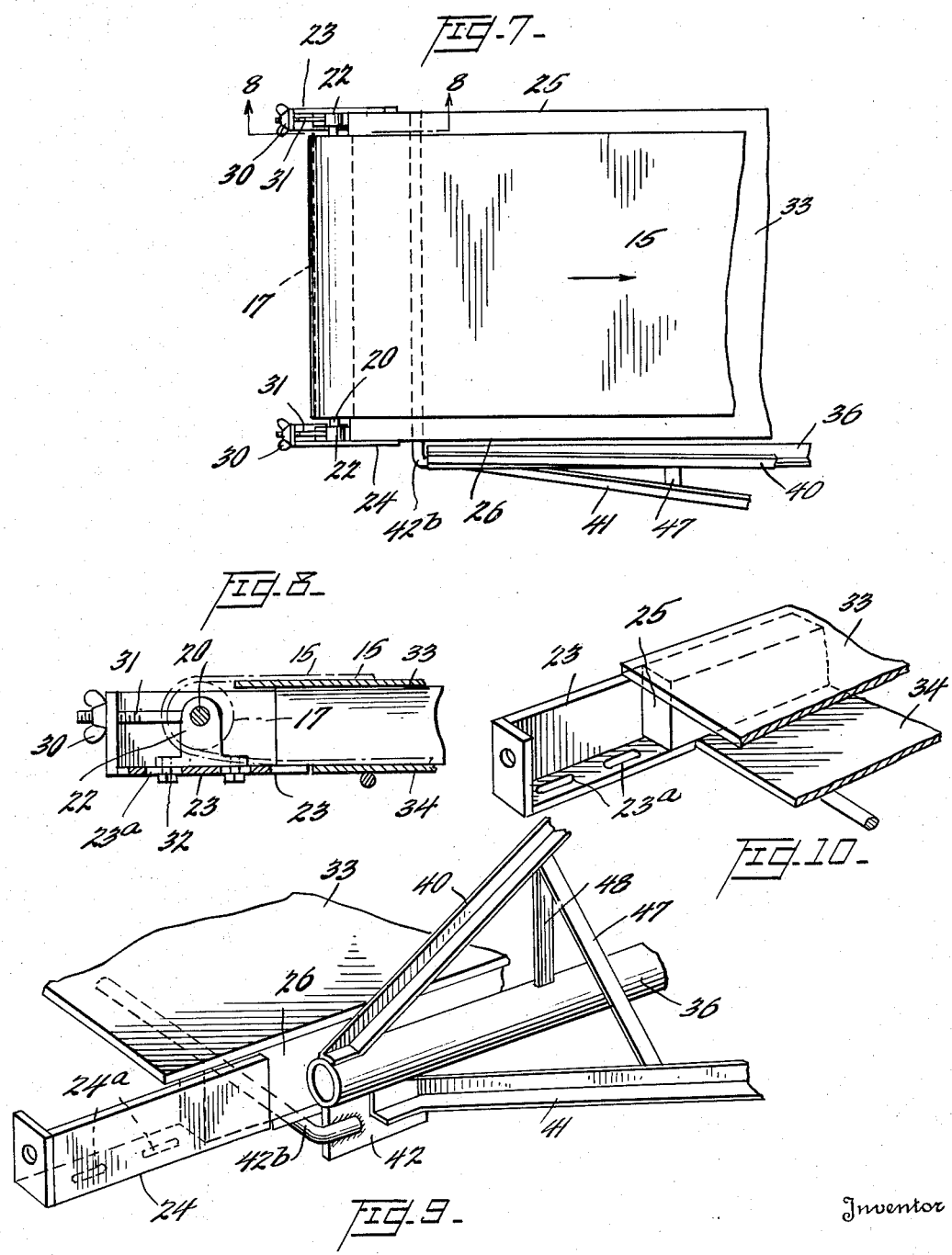

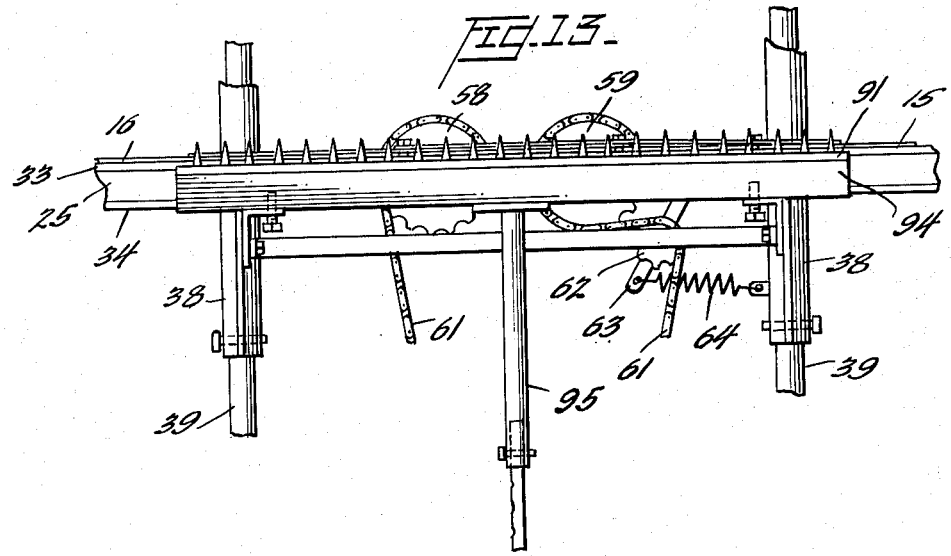
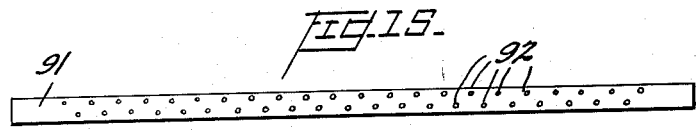
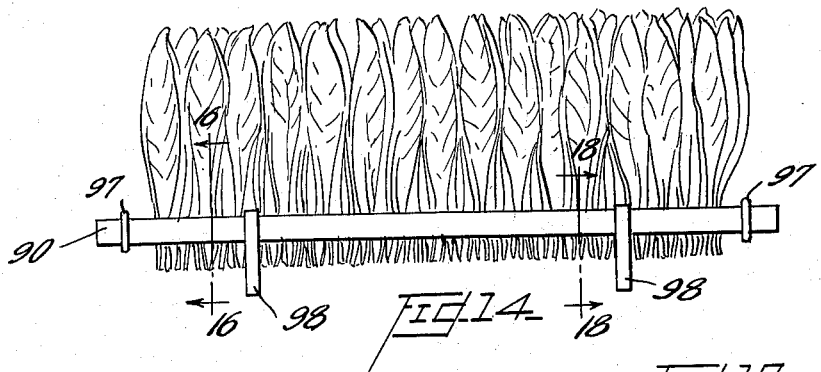
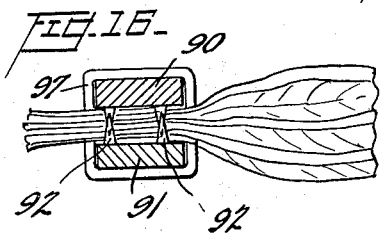
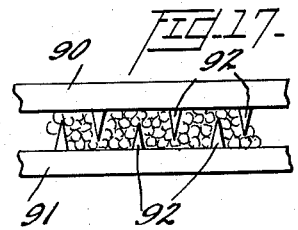
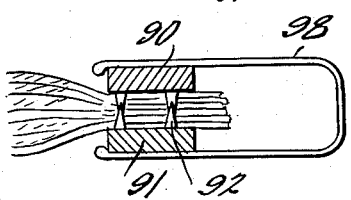

United States Patent Office 2,732,961
Patented Jan. 31, 1956

2,732,961
TOBACCO HARVESTING MACHINES

Evander McIver Ervin, Florence, S. C.

Application June 14, 1954, Serial No. 436,350

1 Claim. (Cl. 214—83.36)

This invention relates to harvesting machines and particularly to harvesting machines of the semi-automatic type adapted to be used in the harvesting of crops which must be manually severed, or withdrawn, from the ground.

For the purpose of harvesting numerous types of field crops such as beets and potatoes fully automatic machines have been suggested and, to a substantial extent actually made and usefully employed. Such automatic machines embody devices for completely uprooting the plant to be harvested, leaving little or nothing in the ground or, in any event, destroying the plant. Certain crops, however, cannot be harvested in this manner since the plants will, if not destroyed, continue to produce further fruit or leafy products over a substantial period of time. Tomato plants, for instance, will continue to bear for weeks and the fruit may be repeatedly harvested if the plants are not injured or destroyed in an early harvesting. Certain varieties of tobacco may be repeatedly harvested, the ripe leaves being severed as they mature and removed for curing and storing. Heretofore the harvesting of such crops has been accomplished only, in actual practice, by manual labor, each worker acting independently of others and separately harvesting and packing the fruit or leaves separated from the individual bearing plants.

In the harvesting of tobacco it has been customary for each worker to cut from successive tobacco plants a series of ripe leaves, assemble the leaves on a "stick," and then carry the leaf-laden stick to a farm wagon or the like which, when loaded, is moved on to the tobacco drying shed where the sticks are mounted upon supports so as to suspend the leaves for curing in the air. In the average case, the tobacco leaves so harvested are injured to a substantial extent due to careless handling, particularly in placing the leaf-laden sticks on the conveyor which is to take them to the drying shed. The labor involved is severe and the cost of harvesting tobacco in this manner is substantial due not only to injury of the leaves, but also to the relatively high labor cost, the harvesting proceeding slowly under such circumstances.

The present invention contemplates a harvesting machine by the use of which one engaged in the harvesting of crops, particularly leafy crops individual elements of which must be severed from the ground without destroying the mother plant, which will not only reduce the actual cost of harvesting but which will insure a superior product, the harvested leaves being much less subject to injury than in the case of any method of harvesting heretofore proposed. By the use of the improved apparatus some portion of the labor involved in the harvesting of the tobacco leaves is lifted from the shoulders of the workers and is transferred to a power driven mechanism but, more important still, the improved harvester makes it possible for a harvesting group or gang to work as a team instead of as individuals with the net result that the work accomplished by the group or team in a given length of time is greater than the amount of work which can be accomplished by the same number of individual workers proceeding entirely independently of each other as heretofore.

More specifically stated the invention comprises novel conveyor means mounted on a mobile frame which may be drawn across a tobacco field or the like, longitudinally of the rows, the conveyor being disposed transversely of the rows when in its operative position and extending over a plurality of such rows. When tobacco is being harvested a worker is assigned to each row of plants over which the conveyor is moved and that worker will sever from each plant of the row to which he has been assigned the ripe leaves as he comes to them, immediately placing such leaves upon the conveyor. Where the conveyor for instance bridges three rows of tobacco there will be stationed three harvesters in the immediate proximity of the conveyor and each will busy himself in severing leaves from successive plants of the row to which he has been assigned, as the conveyor advances, successively placing these severed leaves upon the conveyor at its nearest point. There will thus be three harvesting stations for a conveyor which bridges three rows and a worker will be assigned to each station. The conveyor continuously operates to move the leaves placed thereon in the direction of its length as the conveyor advances and the leaves are ultimately delivered to a station which may be designated a crop-receiving station where there is stationed a fourth worker who will receive the delivered leaves, secure them upon sticks, and then deposit the leaf-laden sticks successively as filled upon a cart or goods wagon of suitable character. The cart or wagon is moved by or with the harvesting machine across the field and is always in convenient reach of that worker.

Preferably the harvesting machine includes two such conveyors extending outwardly in opposite directions from a centrally located crop receiving station and the conveyors may be made of any convenient length. Where the harvester thus comprises two relatively long conveyors these are so mounted upon the supporting frame that they may be swung into substantial parallelism when the conveyor is to be transported from field to field, in order that it may move along the average narrow farm road or along a public highway without jeopardizing other vehicles.

By way of example one embodiment of the invention is disclosed in the accompanying drawings. It will be understood that the harvesting machine thus illustrated is one which has been primarily designed for use in the harvesting of tobacco and that, where other crops are to be harvested, or the conveyor is to be of a size different from that which has been selected for the purpose of disclosure, the design and arrangement of its component elements may be substantially varied.

In the drawings:

Figure 1 is a plan view of the harvesting machine shown to be in operative position in a field of leafy plants such as tobacco, arranged in rows;

Figure 2 is a front elevation of the machine shown in Figure 1;

Figure 3 is a side elevation thereof;

Figure 4 is a plan view of the machine showing the conveyors folded or swung to inoperative position, the harvester being thus reduced in width for movement over a farm road or public highway;

Figure 5 is a section on line 5—5 of Figure 1;

Figure 6 is a section on line 6—6 of Figure 1;

Figure 7 is a plan view of the end of one of the conveyors drawn on a larger scale;

Figure 8 is a section on line 8—8 of Figure 7;

Figure 9 is a perspective view showing the details of construction of one corner of a conveyor supporting frame, at the outer end thereof;

Figure 10 is a perspective view of another corner of a conveyor supporting frame;

Figure 11 is a plan view of portion of the crop receiving platform;

Figure 12 is a section on line 12—12 of Figure 2, but on a somewhat larger scale;

Figure 13 is an elevational view which shows in detail the means utilized at the crop-receiving station for placing the leaf stems of a selected series of tobacco leaves on a "stick";

Figure 14 is a plan view of such a stick showing an engaged group of tobacco leaves;

Figure 15 is a plan view of one portion of the tobacco "stick," which is in the nature of a tobacco leaf stem clamping device embodying two such sticks;

Figure 16 is a section on line 16—16 of Figure 14, upon a somewhat larger scale;

Figure 17 is a side elevation of the stick upon the scale of Figure 16; and

Figure 18 is a section on line 18—18 of Figure 14.

It will be observed from an inspection of Figure 1 of the drawings that the harvesting apparatus disclosed is mounted upon a wheeled frame generally indicated by the numeral 20. The apparatus is preferably drawn by a tractor, truck, or the like, a portion of which is indicated at 10, having a power take-off 21 from which power for the operation of the harvester may be taken. To the rear of the mobile harvester frame 8 may be attached, as by means of a separable coupling 11, a wheeled platform 12 upon which the harvested leaves, assembled in groups upon sticks, may be piled. The detailed of construction of the truck or tractor 10 and the wheeled carriage 12 may be varied widely to suit conditions and, if no engine powered vehicle such as diagrammatically indicated at 10 is available the frame 8 may be coupled to a farm wagon drawn by animals, the conveyors being then operated as the frame 8 is advanced in a manner hereinafter to be described. In the case of the harvester illustrated the forward end of the frame 8 is connected to the power driven vehicle 10 by means of a separable coupling, a portion of which is indicated at 13 and the vehicle 10 includes a horizontally disposed rearwardly extending shaft 14 which is driven by power taken from the engine of the vehicle and may be designated a power take-off shaft.

The conveyors, of which there are two, include endless belts 15 and 16, each belt passing around two spaced parallel rollers, one at each end of the conveyor frame, the outer belt supporting roller of each conveyor, one of which is indicated at 17 in Figures 7 and 8, being adjustably supported and the inner rollers, indicated respectively at 18 and 19 in Figure 5, being supported for rotation about the fixed axes. The parallel rollers 17 and 18 of each conveyor are supported upon axles 20 and 21, respectively, the axles 20 being in turn supported upon brackets 22 slidably mounted upon parallel horizontal frame parts 23 and 24, respectively, these frame parts being parallel prolongations of the main structural members 25 and 26 of the associated frame. The axles or rods 21 upon which the rollers 18 and 19 are mounted are connected by bracket members 28 to the inner ends of members 25 and 26. By means of wing nuts 30 threaded upon rods 31 connected to slidable brackets 22 these brackets may be adjusted longitudinally of the associated conveyor frame members 25 and 26 and the apron or endless belt 16 passing around the same may be stretched or loosened as desired. Bracket 22 carries studs or bolts 32 which extend downwardly through slots 23a and 24a formed in frame parts 23 and 24, respectively, bolts 32 being loosened when brackets 22 are to be adjusted and being tightened after such adjustment to maintain the rollers in the desired positions.

Plates 33 and 34 are disposed in substantial parallelism and the longitudinal margins of these plates are attached, respectively, by suitable securing means, to the upper and lower surfaces of parallel frame members 25 and 26. Plate 33 comprises a support for the upper reach of the endless belt 16 and the lower reach of the endless belt 16 rests upon the upper surface of the plate 34. It will be understood that the endless belt 15 of the second conveyor is similarly supported. The frame of each conveyor thus comprises parallel elongated members 25 and 26, together with suitable bracing or connecting elements and each frame furthermore includes a truss-like structure for supporting it in horizontal position as shown in Figure 2 of the drawings, this truss-like structure comprising a main member 36 of tubular form disposed parallel to frame member 26 and extending from the outer end of that member to a point closely adjacent the inner end thereof, the tubular frame member 36 having its inner end rigidly connected to a like member 38. The axis of member 38 is substantially vertically disposed and this member loosely encircles a vertically extending frame part or member 39. Rods 29 comprise important structural elements of the conveyor-supporting frame.

To the outer end of each tubular structural element 36 is welded or otherwise suitably attached the outer end of an upwardly and inwardly inclined angle member 40 the inner end of this member being likewise connected to the tubular sleeve 38 which encircles frame member 39. A horizontally and forwardly extending channel member 41 having its outer end connected as by welding to a plate 42 which is in turn rigidly secured to the structural member 36, the inner end of member 41 being detachably connected, as by a bolt 43, to a sleeve 42a adjustably mounted on vertical frame member 44. Cross bracing rod 42b connects plate 42 to member 25, being preferably welded to plate 42. Suitable cross braces 47 connect members 40 and 41 at intervals and braces 48 disposed at intervals longitudinally of the tubular frame member 36 connect angle member 40 to member 36, the three members 36, 40 and 41, with the cross braces shown, together comprising outwardly tapering truss-like frame structures which rigidly support the means upon which the endless belts are mounted, and likewise carry the weight of the leaves or other crops which may be placed upon such belts. A bracket 53 extends outwardly from each sleeve 38 and also serves to support the associated conveyor at its inner end, the upper edge of the bracket engaging the lower edge of the corresponding plate 34.

It will be appreciated that the conveyor belts may be otherwise supported in the positions in which they are shown and likewise that, while one only of the conveyor supporting frames has been described in detail, both such frames are identical in construction. The sleeves 38 may be vertically adjusted upon supporting frame members 39 to raise and lower as desired the planes of the upper reaches of the two conveyor belts, for the convenience of the operators. Each post 39 is provided with a plurality of apertures and pins 50 may be passed through these apertures and through aligned apertures in the lower ends of sleeves 38. After removal of pins 50 from sleeves 38, and pins 43b from registering apertures in the sleeve 43a and frame members 44, the belt carrying frames may be vertically adjusted and one conveyor may, if desired, be supported higher or lower than the other in order to permit swinging of the conveyors into parallelism and partially overlapping relationship, as shown in Figure 4 of the drawings, the pins 43b previously referred to being removed prior to any such swinging movements.

The upper ends of vertical frame members 39 are connected by a transverse rod 51 and rod 51 is rigidly connected by an inclined strut 52 with the forward end of the frame 8 so that the U-shaped frame which comprises members 39 and 51 will be maintained at all times in a vertical plane despite the unbalanced weights of the conveyors extending outwardly from this frame. The upper ends of members 44 are connected by tie-rods 55 to the cross member 51 which connects the upper ends of vertical frame members 39, and thus further support members 39 in vertical position.

The conveyor belts 15 and 16 are operated in such manner that the upper reaches thereof move in opposite directions as indicated by the arrows shown in Figure 1, so that articles placed thereon while the harvester is in operation, such for instance as tobacco leaves such as illustrated in Figure 1, will move toward the midpoint of the apparatus, i. e., toward a point above frame 10. The crop-receiving platform comprising two relatively thin overlapping sheets indicated at 56 and 57, respectively, receives the leaves or other articles conveyed to the central point by the two conveyors, the plates comprising the platform closely overlying the belts as indicated clearly in Figure 5 of the drawings. That edge of each of these plates which is first engaged by the on-coming harvested products is substantially V-shaped as shown and each leaf riding up on the plate which it approaches is thus gradually removed from the belt. The belt passes completely under the plate before reaching the roller 18 around which it moves. Plates 56 and 57 are provided with slots indicated at 56a and 57a, respectively, and bolts 65 passing downwardly through these slots enter, respectively, the side frame members 25 and 26. By this arrangement the leaf-receiving platform may be lengthened or shortened as desired.

It will be observed that, in the position in which these plates 56 and 57 are illustrated in Figure 1 of the drawings, the area of possible contact between the successive leaves reaching the platform and the conveyor belt upon which these leaves rest is gradually decreased as more and more of the ends of the leaves ride up on to the platform. The leaves are thus gradually brought to a stop automatically, and there will be at this point an attendant whose duty it is to arrange them in such manner that they may be readily attached to a stick.

Endless belts 15 and 16 are preferably moved in a specified manner by power taken from the prime mover 11 to which the harvesting machine is attached. As will be most clearly observed in Figure 5 of the drawings there is connected to each of the rollers 18 and 19 a sprocket, these sprockets being indicated at 58 and 59. Supported upon the frame at a lower point is a sprocket 60 and extending around and meshing with the teeth of the three sprockets 58, 59 and 60 is a chain 61, chain 61 also passing over the idler sprocket 62 mounted on lever 63 pivotally connected to the frame and normally drawn in such direction as to tension the chain by the spring 64. The sprocket 60 is fixed on shaft 66 supported in a suitable bearing 67 rigid with the frame and its forward end enters a box or casing 68 which contains conventional gearing operable by means of a gear shift lever 70. The gearing within box 68 is connected to the power take-off shaft 14 and lever 70 is adjusted to the position in which it is illustrated the aprons or endless belts of the harvesting machine will be in operation, moving articles in the manner described toward the central platform. The speed of linear movement of both belts may be simultaneously adjusted by shifting the gears within box 68.

It is contemplated that the harvesting machine shall be operable in the event that no power driven prime mover is available. For that reason the platform 8 is mounted upon a wheeled supporting axle which includes a differential gear diagrammatically illustrated at 75. The bevel wheel 76 of the differential gear meshes with a pinion 77 mounted on shaft 78 which shaft is rotatably supported in a bracket 79 secured to the underside of the platform 8. The short shaft 78 carries a sprocket which is connected by a chain 80 to a sprocket mounted upon a sleeve 83 supported on the end of shaft 66. Sleeve 83 may revolve freely upon shaft 66 but is restrained against movement longitudinally thereof by a pin 83a. The inner end of the sleeve is toothed as indicated so that the sleeve comprises one member of a jaw clutch. The second member of the jaw clutch is on the sleeve 84 slidably mounted on shaft 66, being splined to the shaft so as to rotate therewith at all times.

Parallel annular collars 86 on sleeve 84 serve as abutments for the circular lugs of a shifter lever 87 pivotally mounted at 88 upon the platform 8. By moving the shifter lever 87 from its full line position (Figure 12) to its dotted line position, the jaws of the jaw clutch may be caused to interlock so that there is direct operative connection between the axle and the conveyor operating mechanisms. In the event, therefore, that the harvester is drawn across a field by horses, and the clutch members 83 and 84 are engaged, the conveyor aprons will be driven by power taken frictionally from the ground surface by the supporting wheels. It is, therefore, necessary to provide a power unit for operating the harvester but it is, of course, preferable to have a tractor, truck or the like.

A stick of the type previously referred to and by means of which the stems of a number of tobacco leaves may be gripped is illustrated clearly in Figs. 14 to 17, inclusive. It will be seen that the stick in reality comprises two elongated rod-like members 90 and 91 rectangular in transverse section and each provided with a large number of pointed tooth-like protuberances extending outwardly, the protuberances being indicated at 92. The operator at the crop-receiving station will arrange the stems of the tobacco leaves reaching this station so that they overlie the lower member 91 of a stick positioned upon the vertically adjustable stick support 94 if they need rearrangement at this point. When the machine is in operation and a number of tobacco stalks are to be gripped by a stick, the stick supporting member 94 is in such position that the stems of tobacco leaves lying upon the central platform comprising plates 56 and 57 will project over the bottom member of the stick, with its up-turned teeth, as indicated in Figure 1.

The stick support 94 may then be elevated so that the pointed members or prongs 92 thereof pass upwardly through or around the stems of the superposed leaves. To enable this to be done the stick support 94 is adjustably supported on the platform 8, the stick support being mounted upon the upper end of a vertically extending telescopic actuating rod 95 the lower end of which is connected to a foot treadle 96. The length of the actuating rod 95 may be adjusted as the conveyors are vertically adjusted and, when the harvester is in operation, the stick support may be intermittently raised and lowered, lowered when the tobacco leaves are being assembled on the platform and raised when the assembly has been completed. When the stick support has been elevated and the stems of the various leaves engaged by the pins 92 of the lower section of the stick, the upper section is superposed over the lower section and securing rings 97 passed around the ends of the assembled sections so as to lock them together with the teeth thereof biting into the mass of intermediate leaf stems. The various leaves are very firmly engaged by a stick of the type described and this may then be removed and placed upon the trailing cart 12, to be followed by other leaf laden strips each being laid across the cart in the manner indicated in Figure 1 of the drawings.

As may be seen from an inspection of Figures 1 and 2 the harvester may be positioned in a field of growing tobacco plants, the entire frame of the machine being between two rows of such plants and each conveyor overlying three rows. As the machine moves down the field operators stationed approximately at the positions indicated by the letters A, B, C, D, E, and F, which locations may be designated harvesting stations, will cut from successive plants the leaves which are ripe and will place these leaves upon the conveyors. In Figure 1 six groups of leaves are illustrated, one at each harvesting station. The operator who is to receive and package the leaves in the sticks stands at the crop-receiving and packaging station, on the small raised platform P and manually arranges the leaves (if necessary) as they reach him from the two conveyors. One man stationed at the crop-receiving and packaging station G can readily place on sticks the products of the six harvesters who are working at harvesting stations A, B, C, D, E, and F, respectively. The harvesters may place leaves on the conveyors so rapidly that the conveyors may be completely covered with leaves and can work very rapidly, being entirely freed from the necessity of carrying the leaves to a point where they may be affixed to a stick and then transporting the stick and its assembled leaves to a wagon or the like to be transported to a curing shed. A conveyor of the type described may have only one harvesting station on each side, or may have more than three.

If desired the two members 90 and 91 of the stick may be maintained in cooperative leaf-engaging relationship by resilient devices, for instance the spring clips 98 of Figures 14 and 18. These devices may be formed in various ways, but the substantially U-shaped clip illustrated may be conveniently applied and removed. Each such clip will apply a constant pressure to the stick members so as to maintain these members at all times in close engagement with the intermediate leaf stems. The stems, therefore, may not become loose as they dry and thus fall from the stick.

Having thus described the invention, what is claimed as new and desired to be secured by Letters Patent is:

A machine for use in the harvesting of crops which must be manually separated from the ground, said machine comprising a wheeled frame adapted to be moved over a field of crops to be harvested, a plurality of conveyors mounted on and extending horizontally outwardly from said frame, means mounted on the frame for operating the conveyors so as to cause them to convey to a single crop receiving station the plant elements placed on the conveyors at harvesting stations located outwardly of the frame, said receiving station comprising a platform having marginal portions arranged to closely overlie the delivery ends of the conveyors for successively receiving such crop elements and supporting the same until a group of desired size has been accumulated, the marginal portions of said platform being provided with substantially V-shaped recesses, whereby the crops conveyed to and engaged by the said marginal portions of the platform will be gradually removed from the conveyors, and the said platform consisting of two plate sections, the sections being adjustable in the direction of the length of the conveyors, whereby the size of the crop receiving station may be varied.

References Cited in the file of this patent

UNITED STATES PATENTS

| | | |
|---|---|---|
| 1,504,846 | Tarkington | Aug. 12, 1924 |
| 2,267,234 | Garber | Dec. 23, 1941 |
| 2,321,387 | Jackson | June 8, 1943 |
| 2,601,092 | Cardiff | June 17, 1952 |